(12) United States Patent
Froy et al.

(10) Patent No.: US 10,220,310 B1
(45) Date of Patent: Mar. 5, 2019

(54) FOOT ACTUATED INPUT DEVICE FOR ELECTRONIC GAMING MACHINES

(71) Applicant: IGT, Las Vegas, NV (US)

(72) Inventors: David Froy, Lakeville-Westmorland (CA); Benjamin James Hale, Riverview (CA)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 15/672,468

(22) Filed: Aug. 9, 2017

(51) Int. Cl.
  *A63F 13/24* (2014.01)
  *A63F 13/211* (2014.01)
  *A63F 13/218* (2014.01)
  *A63F 13/213* (2014.01)

(52) U.S. Cl.
  CPC ........... *A63F 13/24* (2014.09); *A63F 13/211* (2014.09); *A63F 13/213* (2014.09); *A63F 13/218* (2014.09)

(58) Field of Classification Search
  None
  See application file for complete search history.

(56) References Cited

U.S. PATENT DOCUMENTS

| | | | |
|---|---|---|---|
| 5,613,690 A * | 3/1997 | McShane | A63B 22/18 273/449 |
| 6,695,694 B2 | 2/2004 | Ishikawa et al. | |
| 8,574,080 B2 | 11/2013 | Yamazaki et al. | |
| 2015/0286290 A1* | 10/2015 | Turner | A63F 13/211 345/156 |
| 2017/0185168 A1* | 6/2017 | Bonora | G06F 3/0334 |
| 2018/0042386 A1* | 2/2018 | Hall | A47C 7/506 |

* cited by examiner

*Primary Examiner* — Jay Liddle
*Assistant Examiner* — Alex F. R. P. Rada, II
(74) *Attorney, Agent, or Firm* — Sage Patent Group

(57) ABSTRACT

An input device includes a body having a generally hemispherical shape including a flat side and a curved side opposite the flat side, a foot pad on the flat side of the body, the foot pad including a foot rest position for receiving a foot of a user, a load sensor configured to detect pressure applied to the foot pad by the foot of a user, an accelerometer in the body configured to detect angular motion of the body in response to the pressure applied to the foot pad, and an output circuit coupled to the pressure sensor and to the accelerometer and configured to output data generated by the pressure sensor and the accelerometer.

20 Claims, 13 Drawing Sheets

FOOT ACTUATED INPUT DEVICE FOR ELECTRONIC GAMING MACHINES

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

The present inventive concepts relate to an input device for an electronic gaming machine, and in particular to an input device that is actuated by the feet of a user.

BACKGROUND

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three dimensional display screens.

Previous electronic gaming machines for wagering relied on hand operated controls. More recently, EGMs have been developed that allow players to interact with the machine using other types of inputs, such as haptic sensors, eye tracking, etc. Some video game systems and machines allow input using a user's feet, such as the foot touchpad used in Dance Dance Revolution by Konami or the Wii balance board by Nintendo. Such input devices may not be ideal for using in a casino environment, however, because they may require the user to stand on the input device, while casino patrons often prefer to sit while playing EGMs in a casino environment.

SUMMARY

An input device according to some embodiments includes a body having a generally hemispherical shape including a flat side and a curved side opposite the flat side, a foot pad on the flat side of the body, the foot pad including a foot rest position for receiving a foot of a user, a load sensor configured to detect pressure applied to the foot pad by the foot of a user, an accelerometer in the body configured to detect angular motion of the body in response to the pressure applied to the foot pad, and an output circuit coupled to the pressure sensor and to the accelerometer and configured to output data generated by the pressure sensor and the accelerometer.

The load sensor may be between the platform and the flat side of the body.

The input device may further include a base including an upward facing cavity configured to receive the body and to support the body while the body rotates in place on the base.

The base may include a concave surface defining the cavity and a plurality of rollers in the cavity, and the convex body may rest on, and may be spaced apart from the concave surface by, the plurality of rollers, the plurality of rollers permitting rolling, pitching and yawing of the convex body within the cavity.

The base may include a notch in the cavity and the body may include arm protruding from the body into the notch when the body is positioned in the cavity. The notch may be wider than the arm, and the notch and the arm limit at least one of a pitch angle and a roll angle of the body.

The base may include a projection from the concave convex surface and the convex body may include a notch corresponding to the projection. The notch may be wider than the projection, and the notch and the projection operate to limit at least one of a pitch angle and a roll angle of the convex body when the convex body is mounted in the space defined by the concave convex surface of the base.

The input device may further include an illumination source that illuminates a region of the curved side of the body and an optical sensor that generates images of the illuminated region to enable motion sensing of the body.

The base may include an electromagnet and the body may include a fixed magnet, and the body may be spaced apart from the base by electromagnetic levitation due to interaction of magnetic fields generated by the fixed magnet and the electromagnet.

The foot pad may include a first foot pad and the pressure sensor may include a first load sensor beneath the first foot pad, the platform may include a second foot pad adjacent the first foot pad, and the input device may include a second load sensor between the platform between the second foot pad and the body.

The input device may further include a haptic feedback device coupled to the platform and configured to provide haptic feedback to the user through the foot rest position of the platform.

The accelerometer may include a first accelerometer configured to detect pitch of the convex body, and the user input device may further include a second accelerometer configured to detect roll of the convex body.

The accelerometer further may include a third accelerometer configured to detect yaw of the convex body.

The input device may further include a speaker in the convex body.

The input device may further include an eccentric mass in the body that urges the body to return to an upright position when pressure may be not being applied to the foot pad.

An input device according to further embodiments includes a base having an upward facing concave cavity, a body having a generally hemispherical shape including a flat side and a curved side opposite the flat side, wherein the body may be positioned in the upward facing cavity with the flat side of the body facing away from the upward facing cavity, a foot pad on the flat side of the body, the foot pad including a foot rest position for receiving a foot of a user, a load sensor configured to detect pressure applied to the foot pad by the foot of a user, a position sensor configured to detect angular motion of the body in response to the pressure applied to the foot pad, and an output circuit coupled to the pressure sensor and to the accelerometer and configured to output data generated by the pressure sensor and the accelerometer.

The position sensor may detect angular motion of the body by digital image correlation.

The input device may further include an accelerometer in the body, the accelerometer configured to detect yaw, pitch and roll motion of the body.

An input device according to still further embodiments includes a body configured to rotate in three directions including a yaw direction, a roll direction and a pitch direction, a foot pad on the body for receiving a foot of a user, a position sensor configured to detect angular motion of the body in response to the pressure applied to the foot pad, and an output circuit coupled to the pressure sensor and to the accelerometer and configured to output data generated by the pressure sensor and the accelerometer.

DETAILED DESCRIPTION

Embodiments of the inventive concepts provide game controllers (input devices) for electronic gaming machines (EGMs) that are adapted to be controlled the feet of a player of the EGM. Input devices according to some embodiments may be used while the player is sitting or while the player is standing. That is, in some configurations, the input device may be arranged to allow the player to operate the input device while standing on the input device or while sitting in front of the input device and resting his or her feet on the input device. Operation of one or more aspects of the operation of the EGM may be effected by manipulating the input device with the player's feet. Other aspects of EGM operation may be controlled by other inputs, such as hand inputs, button inputs, touch inputs, voice inputs, gesture inputs, etc.

Figure 1A:
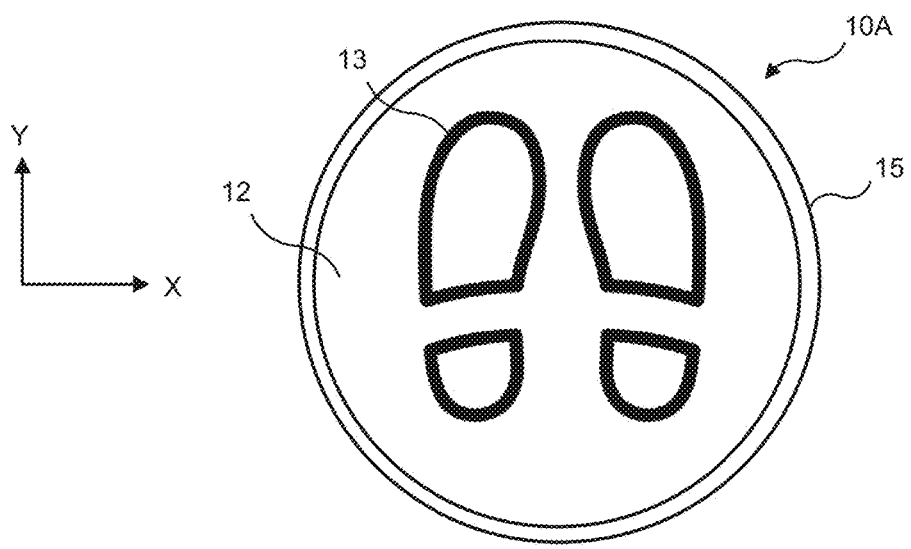
FIG. 1A is a top view and FIG. 1B is a side view of an input device according to some embodiments.
Figure 1B:
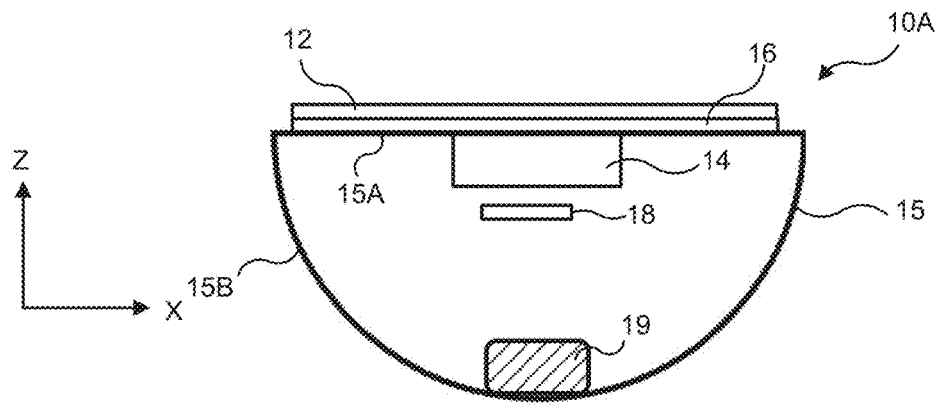

FIG. 1A is a top view and FIG. 1B is a side view of an input device 10 according to some embodiments. As shown therein, in some embodiments, the input device 10 includes a generally bowl-shaped lower body 15 including a generally convex lower surface 15B and a generally flat upper surface 15A. In operation, the input device 10 may be oriented such that the convex lower surface 15B faces downwards and rests on the floor or on a base, mat or other surface, and the flat upper surface 15A faces upwards. A player may operate the input device 10 by resting or placing his or her feet on the upper surface 15A and tilting the input device 10 forwards, backwards, or side to side, or by rotating the input device 10 about a central axis normal to the flat upper surface 15A (i.e., in the z-direction) with their feet. Accordingly, the input device 10 may have at least three degrees of freedom, namely, rotation about the x-, y- or z-axis illustrated in FIGS. 1A and 1B. Because of the bowl-shaped configuration of the lower body 15 of the input device 10, the input device can be rotated about all three axes simultaneously.

The input device 10 may include a foot pad 12 on the upper surface 15A of the lower body 15 that is arranged to receive the feet of the player as indicated by the footprints 13 on the foot pad 12. A pressure sensor or load cell 16 may be provided between the upper surface 15A of the lower body 15 and the foot pad 12 that detects when pressure is applied to the foot pad 12 and responsively generates an electrical signal that is proportional to the amount of force applied to the foot pad 12.

The input device 10 may further include a vibration unit 14 that vibrates in response to a signal from the EGM to provide haptic feedback to the player through vibration of the player's feet. Such feedback may be incorporated into game play on the EGM, for example, to provide feedback to the player upon the occurrence of a predetermined event during game play.

The input device 10 may further include a counterweight 19 provided as an eccentric mass in a lower portion of the lower body 15 that urges the input device to return to an upright position when pressure is not being applied to the foot pad 12.

The input device 10 may further include a 3-axis motion sensor 18 that senses rotation of the lower body 15 about the x-, y- and z-axes and generates an electrical signal indicative of angular motion of the input device 10. The motion sensor 18 may, for example, include a three-axis accelerometer, such as an ADXL345 3-axis digital MEMS accelerometer manufactured by Analog Devices, Inc.

The electrical signal indicative of the motion of the input device 10 is provided to an EGM, which controls the operation of a game in response to the electrical signal, as will be described in more detail below.

Figure 1C:
FIG. 1C is a side cutaway view of an input device according to further embodiments.

The input device 10 illustrated in FIG. 1B has a generally hemispherical shaped lower body 15. However, the lower body 15 may have a different shape, such as only a partial section of a sphere. For example, as shown in FIG. 1C, the input device 10 may include a shallow bowl-shaped lower body 15' that does not form a complete hemisphere. Other configurations of the lower body 15 are possible. For example, the lower body 15 may include ridges, protrusions, or other non-spherical portions that provide tactile feedback causing the input device 10 to favor motion in one direction over another. Stops or limiters could also be formed or provided on the lower body 15 to prevent it from tilting too far in a given direction.

Figure 2A:
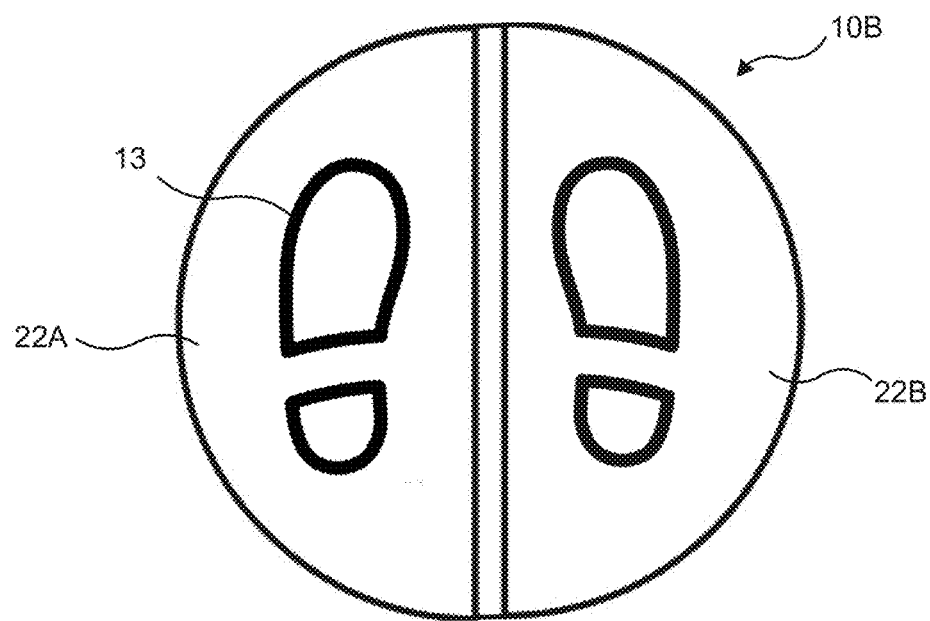
FIG. 2A is a top view and FIG. 2B is a side cutaway view of an input device according to further embodiments.
Figure 2B:
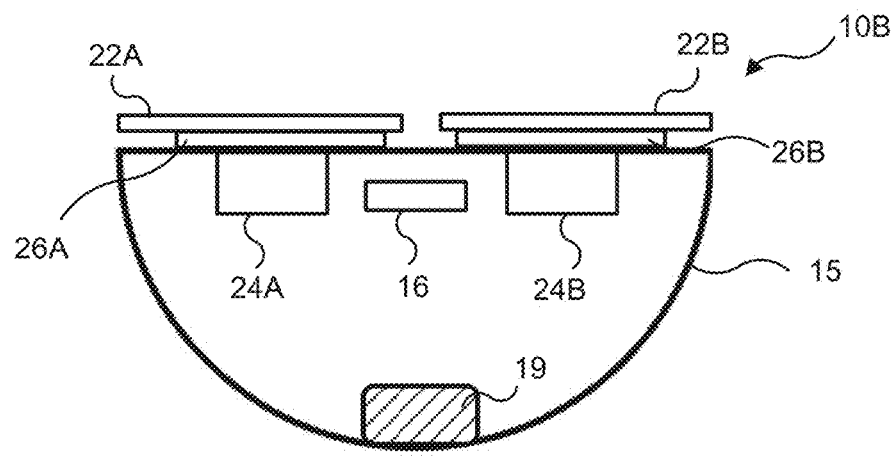

FIG. 2A is a top view and FIG. 2B is a side cross sectional view of an input device 10B according to further embodiments. The input device 10B has a pair of foot pads including left foot pad 22A and right foot pad 22B on which a player may put his or her feet. A corresponding load cell 26A, 26B is provided beneath each of the respective foot pads 22A, 22B to detect an amount of force applied to each of the foot pads 22A, 22B independently. In addition, left and right vibration units 24A, 24B are provided beneath the respective foot pads 22A, 22B to provide independent vibration feedback to each of the player's feet.

Figure 3A:
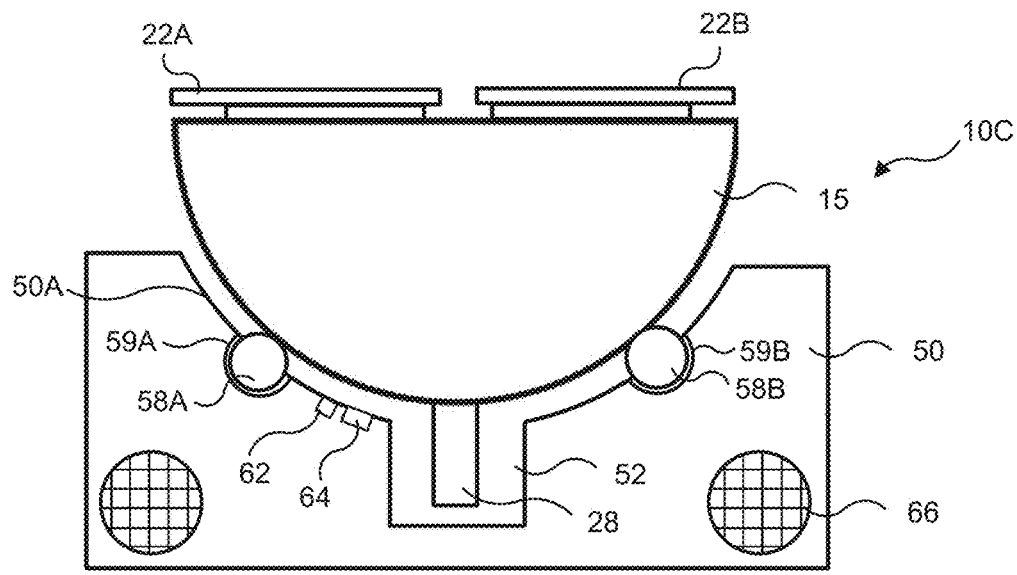
FIGS. 3A, 3B, 3C and 4 are side cutaway views of input devices including a base according to various embodiments.

In some embodiments, the input device may be positioned on or within a housing that provides support for the input device. For example, FIG. 3A is a side cross sectional view of an input device 10C including a base 50 according to some embodiments. The base 50A includes a concave upper surface 50A that receives the convex lower surface 15B of the lower body 15 therein. The base includes a plurality of roller balls 58A, 58B mounted in sockets 59A, 59B that allow the roller balls 58A, 58B to rotate in any direction. The lower body 15 is suspended and allowed to rotate in three dimensions (yaw, pitch and roll) by the roller balls 58A, 58B. Although two roller balls are illustrated, it will be appreciated that the base 50 may include at least three roller balls for stability.

Still referring to FIG. 3A, the input device 10C may include features that prevent the lower body 15 from pitching or rolling too far in a given direction. For example, the input device 10C may include an arm 28 that protrudes from the lower body into a notch 52 in the base 50. When the lower body 15 pitches or rolling by a predetermined amount in a given direction, the arm 28 may contact an inner surface of the notch 52, preventing further movement in that direction. In some embodiments, the cavity may be filled with a viscous liquid that opposes movement of the arm 28 to control a rate at which the lower body rolls and pitches. In addition, fins or other features may be provided on the arm 28 to control a rate at which the lower body yaws.

To determine the position of the lower body 15, the input device 10C may include an illumination source 62, such as a visible or infrared LED, and an optical sensor 64. The illumination source illuminates a region of the outer surface of the lower body 15, and the optical sensor 64 sequentially generates images of the illuminated region. Two dimensional motion of the lower body can be detected by digitally correlating sequential images generated by the optical sensor 64. Motion detection using digital image correlation is used, for example, to detect motion of an optical mouse. To assist with detection of movement, an optical pattern may be formed on the outer surface of the lower body 15.

The base 50 may further include one or more speakers 66 to provide audio feedback to the player.

Figure 3B:
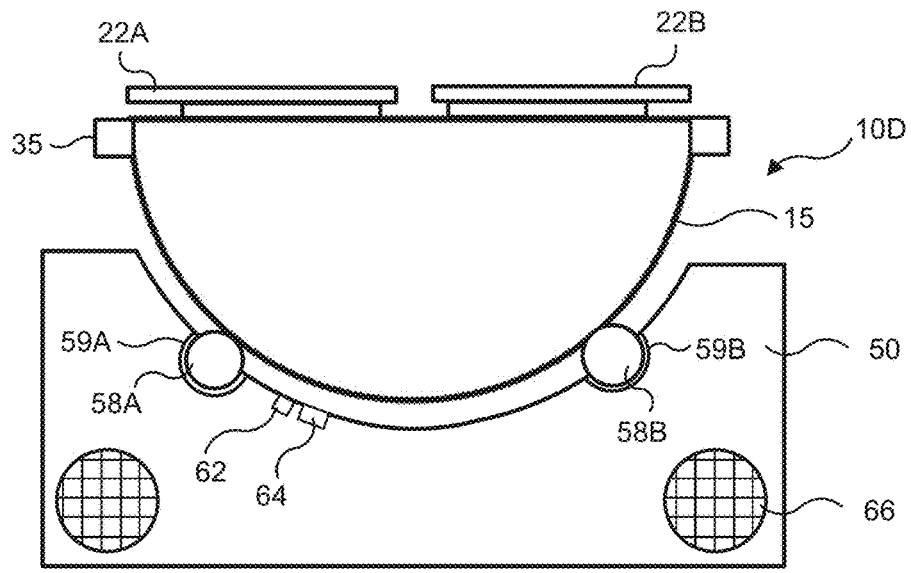

Referring to FIG. 3B, input device 10D according to some embodiments includes a collar 35 that extends circumferentially around an upper portion of the lower body 15 to prevent the lower body 15 from rolling or pitching too far in any direction. That is, when the lower body 15 rolls or pitches by a predetermined angle determined by the dimensions of the base 50, the lower body 15 and the collar 35, the collar 35 will strike the base 50, preventing further movement in that direction.

Figure 3C:
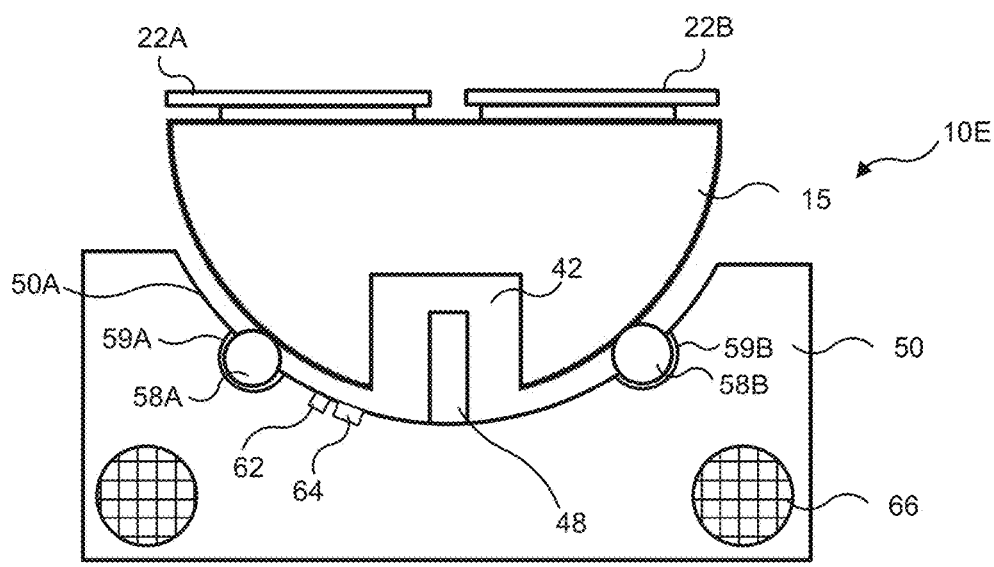

Referring to FIG. 3C, an input device 10E according to some embodiments may include an arm 48 that protrudes from the base 50 into a notch 42 in the lower body 15. When the lower body 15 pitches or rolling by a predetermined amount in a given direction, the arm 48 may contact an inner surface of the notch 42, preventing further movement in that direction.

Figure 4:
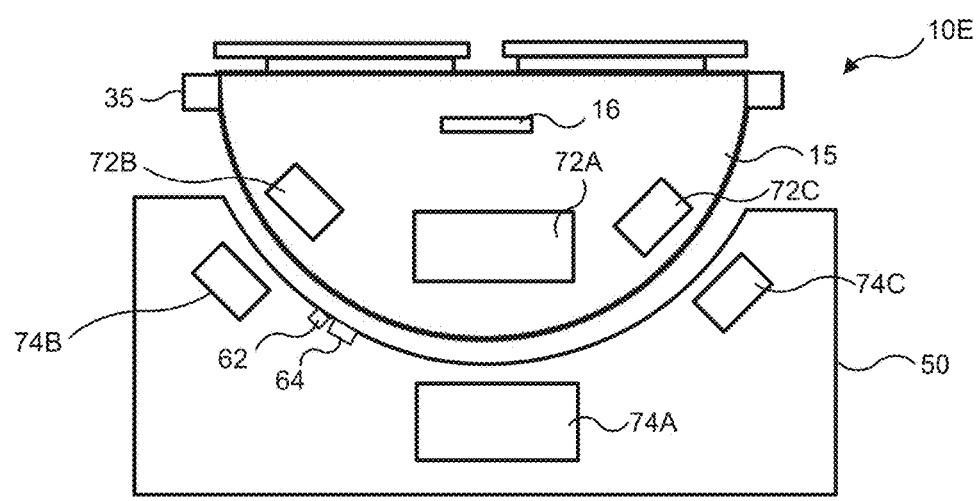

FIG. 4 is a side cross sectional view of an input device 10F including a base 50 according to further embodiments. In the input device 10F, the lower body 15 is suspended from the base 50 by magnetic levitation. In particular, a plurality of permanent magnets 72A, 72B, 72C are provided in the lower body, while a plurality of electromagnets 74A, 74B, 74C are provided in the base. Energizing the electromagnets 74A, 74B, 74C with an appropriate magnitude and direction of electric current causes the permanent magnets 72A, 72B, 72C to be repelled from the electromagnets 74A, 74B, 74C, resulting in levitation of the lower body 15 from the base 50. Conversely, energizing the electromagnets 74A, 74B, 74C with an electric current in the opposite direction may cause the permanent magnets 72A, 72B, 72C to attract the electromagnets 74A, 74B, 74C, resulting in the lower body 15 being locked in place on the base 50. As with the embodiment of FIG. 3B, a collar 35 can be provided on the lower body 15 to limit rotation of the lower body 15.

Figure 5:
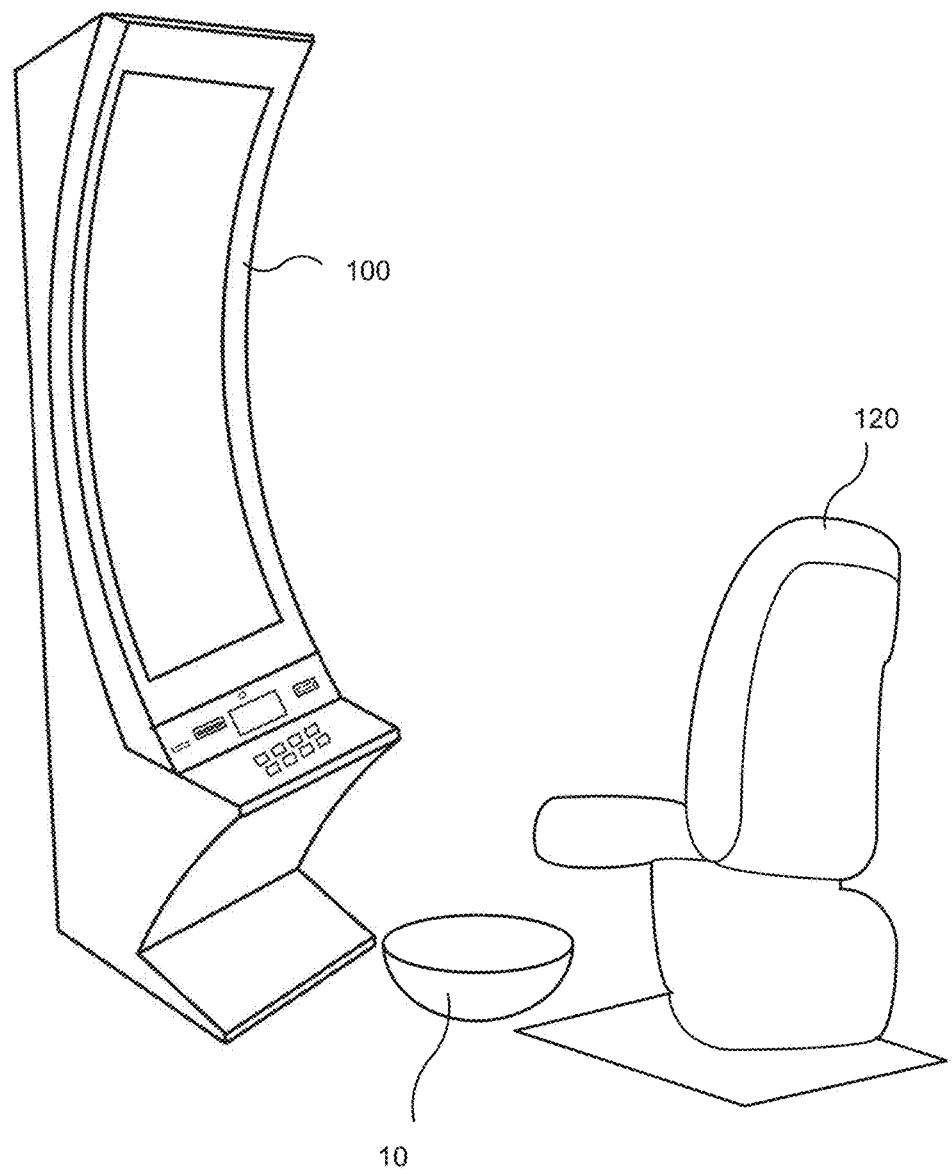
FIG. 5 is a perspective view of an input device and an electronic gaming machine.

FIG. 5 is a perspective view of an input device 10 and an electronic gaming machine (EGM) 100. In particular, FIG. 5 illustrates that the input device 10 may sit between an EGM 100 and a chair 120. A player may sit in the chair 120 and use the input device 10 to control various operations of the EGM 100. In some embodiments, the input device 10 may be integrated into either the EGM 100 or the chair 120.

Figure 6:
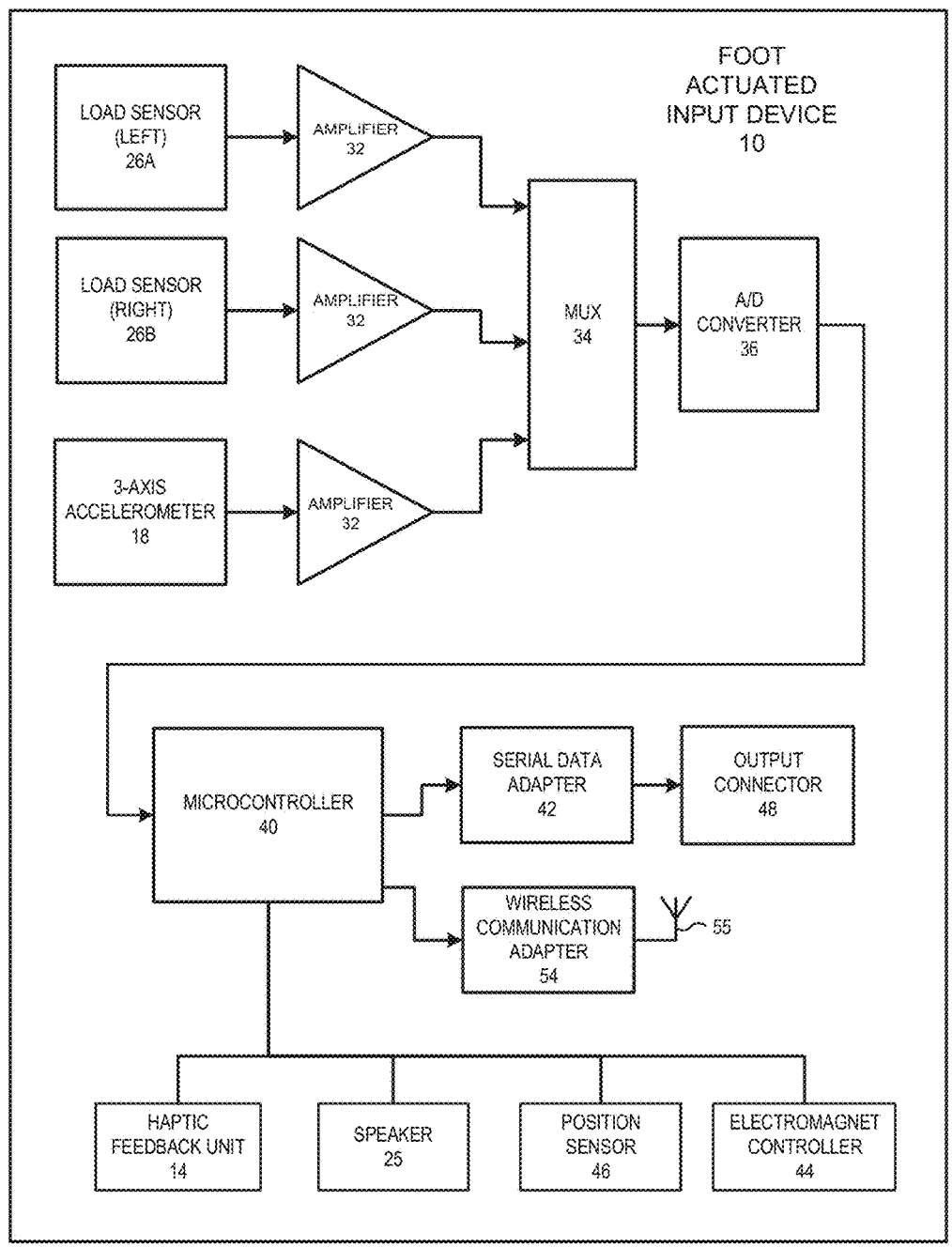
FIG. 6 is a schematic block diagram illustrating various functional components of an input device according to some embodiments.

FIG. 6 is a functional block diagram showing various electronic aspects of an input device 10 according to some embodiments.

The input device 10 includes a microcontroller 40 which may include integrated memory or cache. The microcontroller 20 controls the operations of the input device 10 according to a program stored in the memory. The memory may include flash memory, EEPROM or other non-volatile memory that retains its programming even when power to the device is disconnected.

The input device 10 may include various sensors, including left and right load sensors 26A, 26B that detect force applied to the left and right foot pads 22A, 22B (FIG. 2), a 3-axis accelerometer 18 that detects rotation about an x, y and z axis, and a position sensor 46 that detects movement of the lower body 15. The position sensor 46 may be provided instead of or in addition to the 3-axis accelerometer 18.

Signals output by the left and right load sensors 26A, 26B and the 3-axis accelerometer 18 are amplified by amplifiers 32 and output to an A/D converter 36 by a multiplexer 34 under the control of the microcontroller 40.

The input device 10 further includes output devices for outputting tactile or audio feedback to the player. The output devices include a haptic feedback unit 14 and a speaker 25, each of which is coupled to and controlled by the microcontroller 40. The haptic feedback unit 14 generates vibrations that are transmitted to the feet of the user as feedback. The haptic feedback unit 14 may generate vibrations, for example, by rotating an eccentric mass about a drive shaft.

In some embodiments, the input device 10 may include an electromagnet controller 44 for controlling the electromagnetic levitation of the lower body 15, as illustrated in the embodiment of FIG. 4.

The input device 10 may further include a serial data adapter 42 for outputting serial data to an EGM through an output connector 48. The serial data adapter 42 may include a USB adapter, a UART adapter, or any other suitable interface for communicating serial data to an EGM.

In some embodiments, the input device 10 may include a wireless communication adapter 54 which enables the input device 10 to communicate with an EGM using a wireless communication protocol, such as Bluetooth, NFC, Wi-Fi or other protocol.

Position, force and/or motion data generated by the input device 10 is transmitted to the EGM through the output connector 48 or the wireless communication adapter 54. Such data may be used by the EGM to control operation of a game on the EGM.

Figure 7:
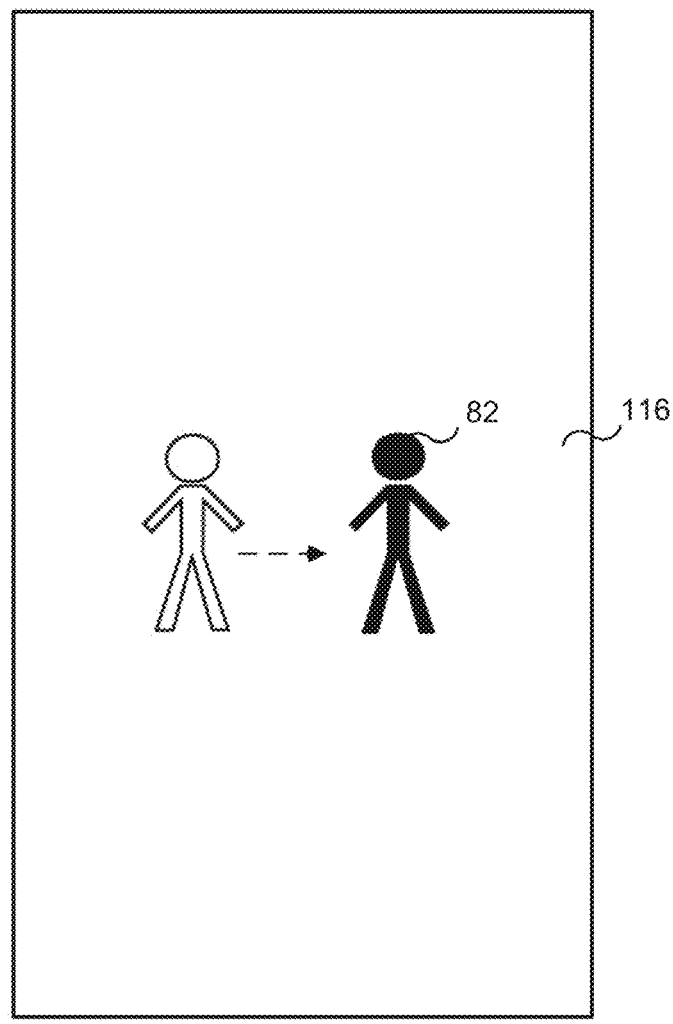
FIGS. 7 to 11 illustrate the use of an input device to control operation of aspects of a game on an electronic gaming machine according to some embodiments.
Figure 7:

For example, an input device 10 according to some embodiments may be used in conjunction with an EGM having a 3D display. In that case, a player may use the input device 10 to control an avatar in the game without touching the screen. Referring to FIG. 7, a primary display screen 116 of an EGM is illustrated along with an input device 10 according to some embodiments. An avatar or character 82 would appear on the 3D display, and would move through a 3D world based upon the tilting and turning of the user's feet. The speed at which the avatar moves may be proportional to the angle at which the input device is tilted and/or the force applied to the input device by the player's feet. The player could traverse the avatar through a series of mazes, using their feet to control the movement of the avatar 82. Using the pressure control of the controller, the user could make the avatar jump by raising their feet off the controller.

As another example, a player could control a virtual camera that shows the view seen by an avatar by rotating the input device 10 in a clockwise or counter-clockwise direction (i.e., yaw rotation about the z-axis) so that the avatar would appear to be looking in different directions around a virtual world.

Figure 8:
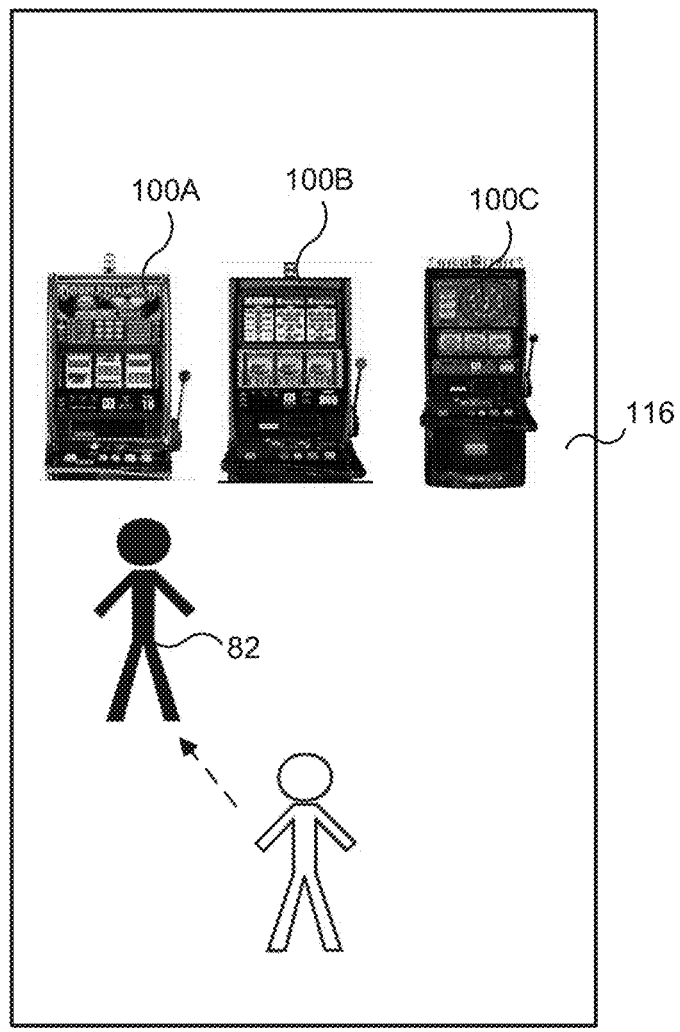

As a further example, referring to FIG. 8, a player could use an input device 10 to cause an avatar 82 to traverse a selection screen displaying multiple virtual gaming machines 100A-100C. For example, the player could use the input device 10 to cause the avatar 82 to walk to different virtual game machines displayed on the EGM and to face the virtual game machine the player wishes to play. Once the avatar 82 is facing the machine 100A-100C the player wishes to play, the player could push down on the input device 10 to allow select the game. Another option would be to have portals that have versions of game to select, where the player causes the avatar 82 to walk through a portal using the input device and enter a virtual world containing the game.

Figure 9:
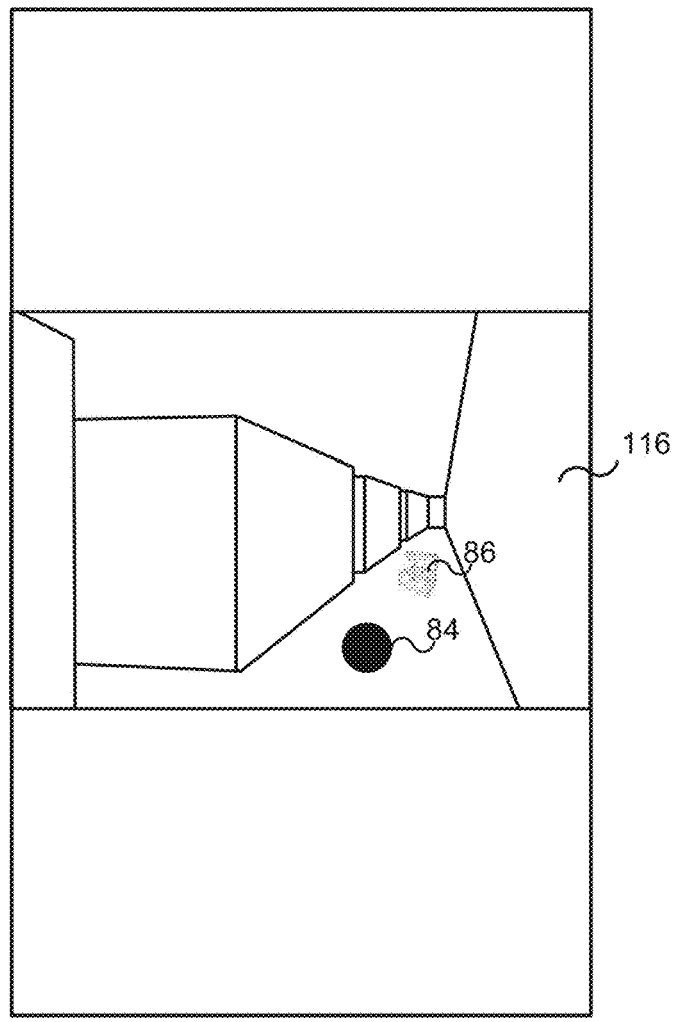
Figure 9:

Referring to FIG. 9, in a 3D maze game, a player could control a ball 84, and have the input device tilt the world and move the ball through the level (i.e., tilt the surface of the level). The level could contain multiple collectable items 86 with a goal of gathering a specified amount to finish the level. When the player collects objects, the haptic system in the controller could vibrate. Another instance could have a hold in the level, in which the player must tilt the world with the input device 10 and get the ball through the maze and to the opening to exit the level.

An input device 10 may also be used to control a traditional reel-style gaming game, for example, by using the player control of the input device as a button. Tilting the controller forward and back could trigger the reels to start spinning. The input device 10 could be used to nudge the reels once they are stopped, by rocking the controller. The reels could be nudged up or down depending on which way the input device 10 is tilted. Another use of the input device 10 would be to start a reel spin by tilting the controller back and forth. The player could change bets by tilting the input device 10 back to select/adjust a wager and moving the input device 10 sideways to select a wager.

Figure 10:
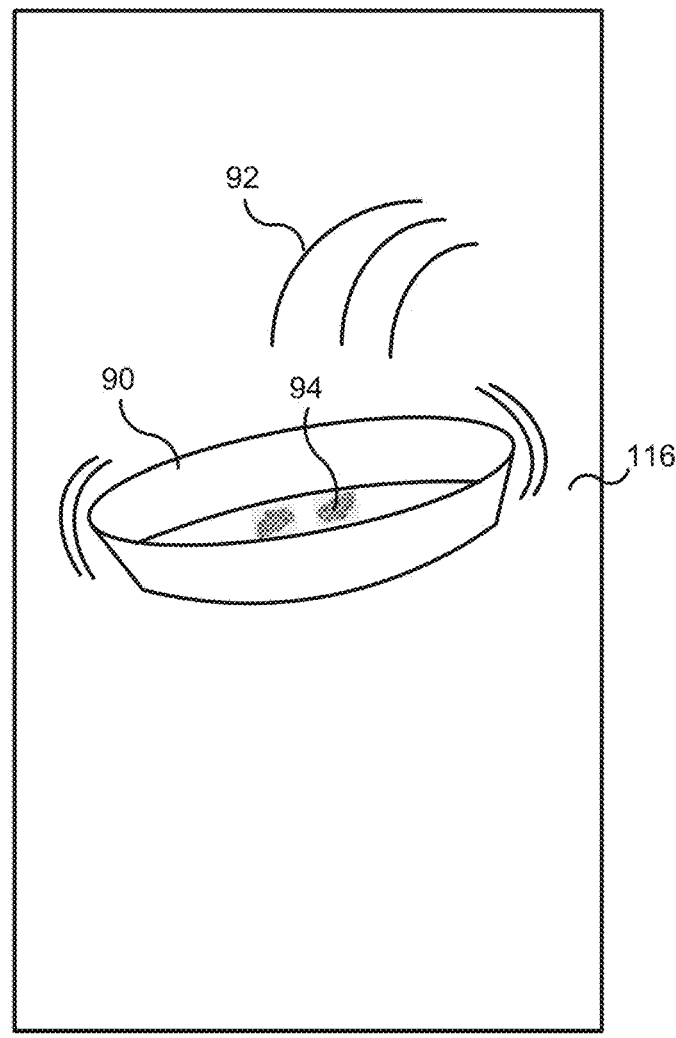
Figure 10:
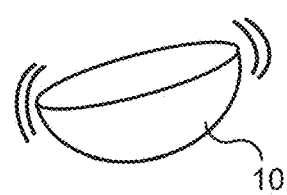

In some embodiments, the input device 10 may be used as part of a bonus game. For example, referring to FIG. 10, a bonus game on an EGM may include simulated panning for gold. A virtual pan 90 is displayed on the screen and filled with virtual dirt that may contain virtual gold. The pan's movements would be tied to the tilt tracking of the input device 10 and would reveal to the player whether or not gold nuggets 94 are contained in the virtual dirt as virtual water 92 is poured into the pan. The player could push down on the input device 10 to increase the amount of water poured into the pan 90. Once the dirt has been cleared out of the pan, the prize amount would be revealed. If the player tilts the controller too much, the pan can empty and the player loses the bonus feature.

Figure 11:
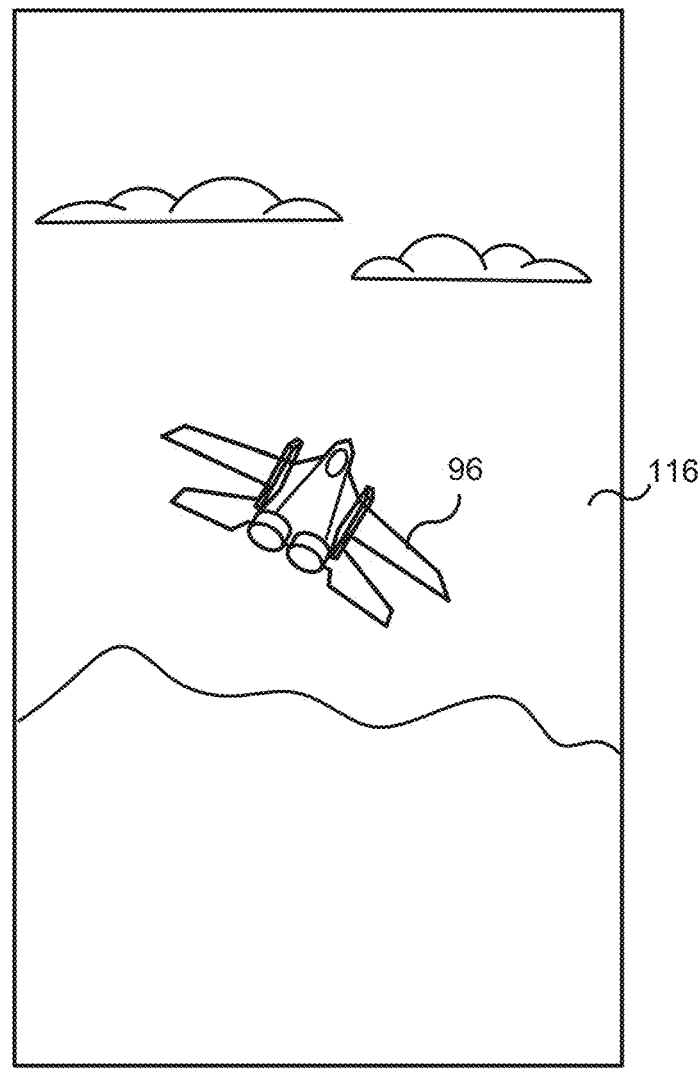
Figure 11:

As a still further example, referring to FIG. 11, the input device 10 could also be used to control a 3rd person perspective airplane bonus feature where an airplane 96 is seen moving forward. The movement of the input device 10 would control the pitch and roll of the airplane 96, as well as being able to perform a barrel roll if the controller is rotated. When the airplane 96 is hit by enemy fire, the haptic feature of the input device would then give the player feedback. Pushing down on the input device would allow the airplane 96 to fire a stronger attack.

Electronic Gaming Machines

Figure 12:
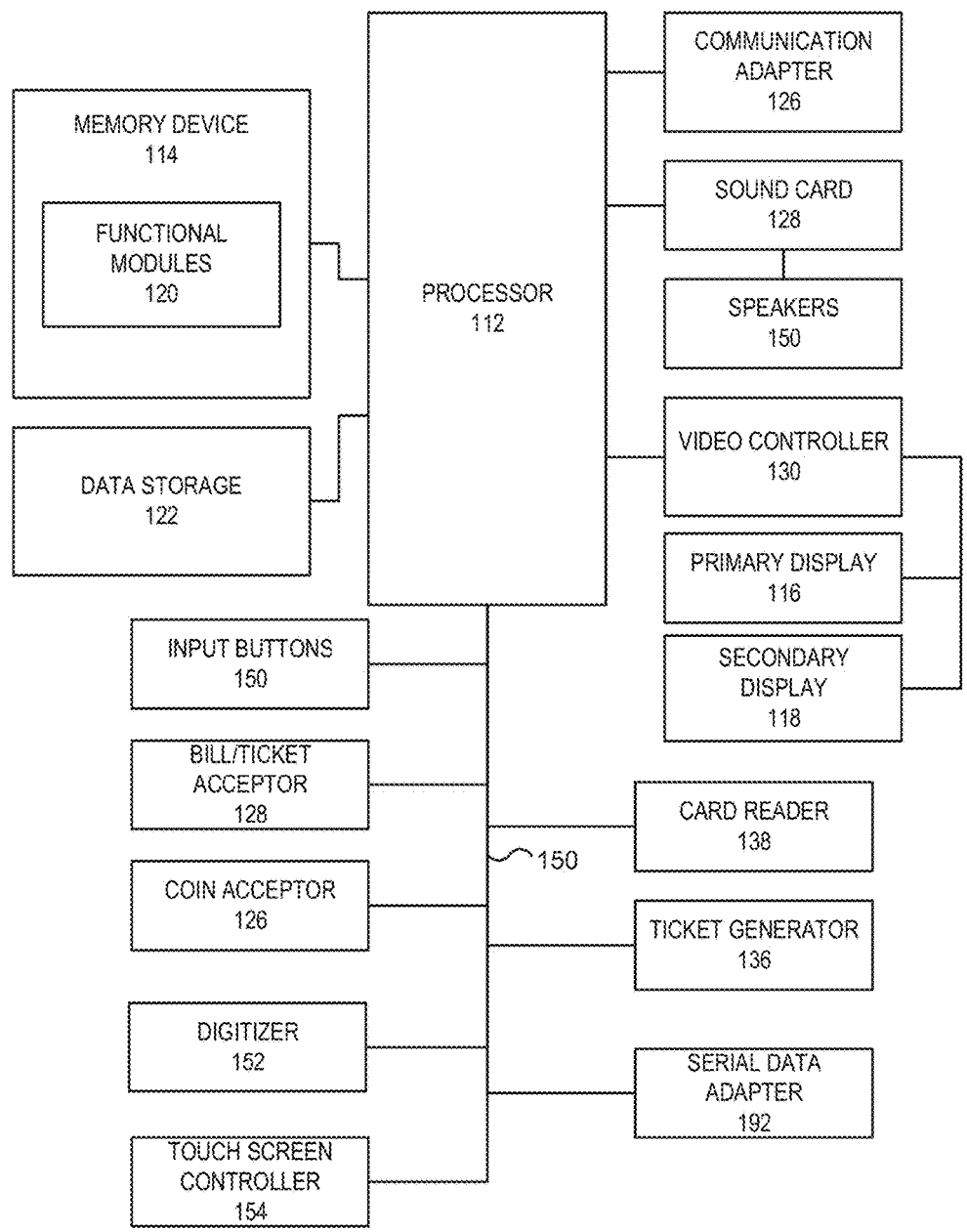
FIG. 12 is a schematic block diagram illustrating various functional components of an electronic gaming machine that can be controlled by an input device according to some embodiments.

FIG. 12 is a schematic block diagram illustrating various functional components of an electronic gaming machine 100 that can be controlled by an input device according to some embodiments. As shown in FIG. 12, the EGM 100 may include a processor 112 that controls operations of the EGM 100. Although illustrated as a single processor, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processor 112 may be variously referred to as a "controller," "microcontroller," "microprocessor" or simply a "computer." The processor may further include one or more application-specific integrated circuits (ASICs).

Various components of the EGM 100 are illustrated in FIG. 7 as being connected to the processor 112. It will be appreciated that the components may be connected to the processor 112 through one or more bus connections 150, such as a system bus, a communication bus and controller, such as a USB controller and USB bus, a network interface, or any other suitable type of connection.

The EGM 100 further includes a memory device 114 that stores one or more functional modules 120 that control the operation of the EGM 100 and applications thereon. The memory device 114 may store program code and instructions, executable by the processor 112, to control the EGM 100. The memory device 114 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (MRAM), ferro-electric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 122, such as a hard disk drive or flash memory. The data storage 122 may store program data, player data, audit trail data or any other type of data. The data storage 122 may include a detachable or removable memory device, including, but not limited to, a suitable cartridge, disk, CD ROM, DVD or USB memory device.

The EGM 100 may include a communication adapter 126 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor 112 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor through a universal serial bus (USB) hub (not shown) connected to the processor 112.

The EGM 100 may include a video controller 130 that controls a primary display device 116 and a secondary display device 118 to display images to the player, a sound card 128 and speakers 150 for generating sounds. The EGM 100 may include other functional components, such as input buttons 150, a bill/ticket acceptor 128, a coin acceptor 126, a digitizer 152 and touchscreen controller 154, a card reader 138 and a ticket generator 136.

The EGM 100 may further include a serial data adapter, such as a USB adapter, that can be used to connect the input device 10 to the EGM 100.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. An input device, comprising:
   a body comprising an upper surface and a spherically curved convex lower surface opposite the upper surface;
   a foot pad on the upper surface of the body, the foot pad for receiving a foot of a user at a foot rest position;
   a position sensor in the body that detects angular motion of the body and generates data based on the angular motion when pressure is applied to the foot pad;
   an output circuit coupled to the position sensor that outputs the data when the data is generated by the position sensor;
   a base comprising a concave surface defining an upward facing cavity that supports the body and permits rotation of the body within the cavity about three axes of rotation;
   a projection extending from the convex lower surface of the body, the projection comprising a first width; and
   a notch formed in the concave surface of the base, the notch comprising an inner surface defining a second width larger than the first width of the projection, wherein the projection and the inner surface of the notch limit rotation of the body within the cavity about one of the three axes of rotation.

2. The input device of claim 1, further comprising a load sensor that detects a load applied to the foot pad by the foot of the user and generates data based on the pressure when the load is applied to the foot pad.

3. The input device of claim 2, wherein the foot pad comprises a first foot pad and a second foot pad, and
   wherein the load sensor comprises a first load sensor between the first foot pad and the body, a second load sensor between the second foot pad and the body.

4. The input device of claim 1, wherein the base comprises a plurality of rollers in the cavity, wherein the body rests on, and is spaced apart from the concave surface by, the plurality of rollers, the plurality of rollers permitting rotation of the body within the cavity about the three axes of rotation.

5. The input device of claim 1, further comprising an illumination source that illuminates a region of the convex lower surface of the body and an optical sensor that generates images of the illuminated region to enable motion sensing of the body.

6. The input device of claim 1, wherein the base comprises an electromagnet and the body comprises a fixed magnet, and wherein the body is spaced apart from the base by electromagnetic levitation due to interaction of magnetic fields generated by the fixed magnet and the electromagnet.

7. The input device of claim 1, further comprising a haptic feedback device coupled to the base that provides haptic feedback to the user through the foot pad when the foot pad receives the foot of the user at the foot rest position.

8. The input device of claim 1, wherein the position sensor comprises:
   a first accelerometer that detects pitch of the body about a first axis of rotation of the three axes of rotation when the body rotates within the cavity; and
   a second accelerometer that detects roll of the body about a second axis of rotation of the three axes of rotation that is perpendicular to the first axis of rotation when the body rotates within the cavity.

9. The input device of claim 8, wherein the position sensor further comprises a third accelerometer that detects yaw of the body about a third axis of rotation of the three axes of rotation that is perpendicular to the first axis of rotation and the second axis of rotation when the body rotates within the cavity.

10. The input device of claim 1, further comprising a speaker in the body.

11. The input device of claim 1, further comprising an eccentric mass in the body that urges the body to return to an upright position when pressure is not being applied to the foot pad.

12. The input device of claim 1, wherein the position sensor detects angular motion of the body by digital image correlation when the body rotates about within the cavity.

13. The input device of claim 1, wherein the position sensor comprises an accelerometer that detects yaw, pitch and roll motion of the body when the body rotates about within the cavity about the three axes of rotation.

14. The input device of claim 1, wherein the projection and the notch limit rotation of the body within the cavity about two of the three axes of rotation.

15. The input device of claim 1, wherein the convex lower surface of the body is hemispherically shaped.

16. The input device of claim 1, wherein the upper surface of the body is flat.

17. An input device, comprising:
 a body comprising an upper surface and a spherically curved convex lower surface opposite the upper surface;
 a foot pad on the upper surface of the body, the foot pad for receiving a foot of a user at a foot rest position;
 a position sensor in the body that detects angular motion of the body and generates data based on the angular motion when pressure is applied to the foot pad;
 an output circuit coupled to the position sensor that outputs the data when the data is generated by the position sensor;
 a base comprising a concave surface defining an upward facing cavity that supports the body and permits rotation of the body within the cavity about three axes of rotation;
 a projection extending from the concave surface of the base, the projection comprising a first width; and
 a notch formed in the convex lower surface of the body, the notch comprising an inner surface defining a second width larger than the first width of the projection, wherein the projection and the notch limit rotation of the body within the cavity about one of the three axes of rotation.

18. The input device of claim 17, wherein the projection and the notch limit rotation of the body within the cavity about two of the three axes of rotation.

19. An input device, comprising:
 a body comprising an upper surface and a spherically curved convex lower surface opposite the upper surface;
 a foot pad on the upper surface of the body, the foot pad for receiving a foot of a user at a foot rest position;
 a position sensor in the body that detects angular motion of the body and generates data based on the angular motion when pressure is applied to the foot pad;
 an output circuit coupled to the position sensor that outputs the data when the data is generated by the position sensor;
 a base comprising a concave surface defining an upward facing cavity that supports the body and permits rotation of the body within the cavity about three axes of rotation;
 a first magnet in the base that generates a first magnetic field; and
 a second magnet in the body that generates a second magnetic field,
 wherein the first magnetic field and the second magnetic field interact to support the body and to space the body apart from the base by electromagnetic levitation.

20. The input device of claim 19, wherein the first magnet is an electromagnet and the second magnet is a fixed magnet.

* * * * *